US011020926B2

(12) United States Patent
Lewis et al.

(10) Patent No.: US 11,020,926 B2
(45) Date of Patent: Jun. 1, 2021

(54) VOLTAGE SIGNAL ADAPTOR FOR MACHINE PRESS COMMUNICATION

(71) Applicant: Toyota Motor Engineering & Manufacturing North America, Inc., Erlanger, KY (US)

(72) Inventors: Dale A. Lewis, Lexington, KY (US); Edward F. Flaga, Lexington, KY (US); Ralph H. Gibbs, Demossville, KY (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 1196 days.

(21) Appl. No.: 15/208,150

(22) Filed: Jul. 12, 2016

(65) Prior Publication Data

US 2018/0015681 A1 Jan. 18, 2018

(51) Int. Cl.
| | |
|---|---|
| B30B 15/00 | (2006.01) |
| B21D 43/02 | (2006.01) |
| B30B 15/26 | (2006.01) |
| H02M 7/00 | (2006.01) |
| B30B 15/14 | (2006.01) |
| H02M 7/04 | (2006.01) |
| B21D 37/00 | (2006.01) |

(52) U.S. Cl.
CPC ............ *B30B 15/26* (2013.01); *B30B 15/146* (2013.01); *B30B 15/148* (2013.01); *H02M 7/00* (2013.01); *B21D 37/00* (2013.01); *H02M 7/04* (2013.01)

(58) Field of Classification Search
CPC .......... B30B 15/26; H02M 7/00; B21D 24/10
See application file for complete search history.

(56) References Cited

U.S. PATENT DOCUMENTS

| | | | |
|---|---|---|---|
| H1203 H | * | 7/1993 | Oster .............................. 100/35 |
| 5,622,069 A | | 4/1997 | Walters |
| 6,559,556 B1 | * | 5/2003 | Wills ........................ G06F 1/26 307/10.1 |
| 7,892,230 B2 | * | 2/2011 | Woloszko .......... A61B 18/1482 606/41 |
| 8,220,384 B2 | | 7/2012 | Bosga |
| 8,896,260 B2 | | 11/2014 | Kuboe |
| 9,000,582 B2 | | 4/2015 | Hiramitsu et al. |

(Continued)

FOREIGN PATENT DOCUMENTS

| | | |
|---|---|---|
| JP | 5048540 | 10/2012 |
| JP | 2015100834 | 6/2015 |
| WO | 2007091964 | 8/2007 |

*Primary Examiner* — Dinh T Le
(74) *Attorney, Agent, or Firm* — Dinsmore & Shohl LLP (57) ABSTRACT

A voltage signal adaptor includes a housing, a die cable extending outward from the housing and terminating at a die cable end engageable with a manufacturing die comprising one or more die sensors, and a cable receptacle communicatively coupled to the die cable. The cable receptacle is engageable with a bolster cable of a machine press communicatively coupled to a press line programmable logic controller. The voltage signal adaptor further includes a step down power supply positioned between and communicatively coupled to the cable receptacle and the die cable and one or more signal conversion switches positioned between and communicatively coupled to the cable receptacle and the die cable.

10 Claims, 3 Drawing Sheets

(56) References Cited

U.S. PATENT DOCUMENTS 10,245,802 B2* 4/2019 Lewis ................. B30B 15/0094
2005/0117376 A1* 6/2005 Wilson ................... G06F 1/263
　　　　　　　　　　　　　　　　　363/142

* cited by examiner

VOLTAGE SIGNAL ADAPTOR FOR MACHINE PRESS COMMUNICATION

TECHNICAL FIELD

The present specification generally relates to press line systems including machine presses and manufacturing dies and, more particularly, to press line systems including voltage signal adaptors configured to facilitate communicative coupling within the press line system.

BACKGROUND

Machine presses may be positioned in a press line system and may be controlled by a press line programmable logic controller. Various manufacturing dies may be positioned on the machine presses of the press line system to provide tooling for a variety of manufacturing operations. The manufacturing dies may be coupled with the machine presses such that that the press line programmable logic controller, the machines presses, and the manufacturing dies of the press line systems are communicatively coupled. However, some manufacturing dies are not communicatively compatible with some press line systems.

Accordingly, there is a desire for a die compatibility adaptor that facilitates communicative coupling of manufacturing dies within press line systems.

SUMMARY

In one embodiment, a voltage signal adaptor includes a housing, a die cable extending outward from the housing and terminating at a die cable end engageable with a manufacturing die comprising one or more die sensors, and a cable receptacle communicatively coupled to the die cable. The cable receptacle is engageable with a bolster cable of a machine press communicatively coupled to a press line programmable logic controller. The voltage signal adaptor further includes a step down power supply positioned between and communicatively coupled to the cable receptacle and the die cable and one or more signal conversion switches positioned between and communicatively coupled to the cable receptacle and the die cable.

In another embodiment, a press line system includes a press line programmable logic controller configured to output an alternating current control signal, a machine press, and a manufacturing die having one or more die sensors. The manufacturing die is coupled to the machine press, the one or more die sensors are configured to receive a direct current control signal and output a direct current sensor signal and the manufacturing die comprises a workspace. The press line system further includes a voltage signal adaptor communicatively coupled to the press line programmable logic controller and the one or more die sensors. The voltage signal adaptor includes a step down power supply and one or more signal conversion switches.

In yet another embodiment, a method of communicatively coupling a manufacturing die and a press line programmable logic controller includes positioning the manufacturing die on a machine press. The machine press includes a bolster cable and the manufacturing die comprises one or more die sensors. The method further includes providing a voltage signal adaptor having a housing, a die cable engageable with the manufacturing die, a cable receptacle communicatively coupled to the die cable and configured to receive the bolster cable, a step down power supply positioned between and communicatively coupled to the cable receptacle and the die cable, and one or more signal conversion switches positioned between and communicatively coupled to the cable receptacle and the die cable. Moreover, the method includes coupling the die cable to the manufacturing die, coupling the bolster cable to the cable receptacle, outputting, using the press line programmable logic controller, an alternating current control signal, and converting, using the step down power supply, the alternating current control signal into a direct current control signal.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to press line systems including a voltage signal adaptor for communicatively coupling a manufacturing die of a machine press to a press line programmable logic controller configured to output control signals to operate one or more functions of both the machine press and the manufacturing die. The manufacturing die includes one or more die sensors, for example, one or more proximity sensors configured to output direct current proximity sensor signals and/or one or more gas sensors configured to output direct current gas sensor signals. In operation, the one or more die sensors are configured to operate upon receipt of a direct current control signal. The voltage signal adaptor includes a housing, a die cable that can be coupled with the manufacturing die, and a cable receptacle configured to receive a bolster cable of the machine press that is communicatively coupled to the press line programmable logic controller configured to output alternating current control signals. The voltage signal adaptor includes a step down power supply configured to convert alternating current control signals received by the voltage signal adaptor from the press line programmable logic controller to direct current control signals, which are receivable by the one or more die sensors. The voltage signal adaptor also includes one or more signal conversion switches configured to convert direct current sensor signals received by the voltage signal adaptor from the die sensors of the manufacturing die to alternating current sensor signals receivable by the press line PLC. The voltage signal adaptor facilitates communicatively coupling between press line PLCs and manufacturing dies that were previously incompatible.

Figure 1:
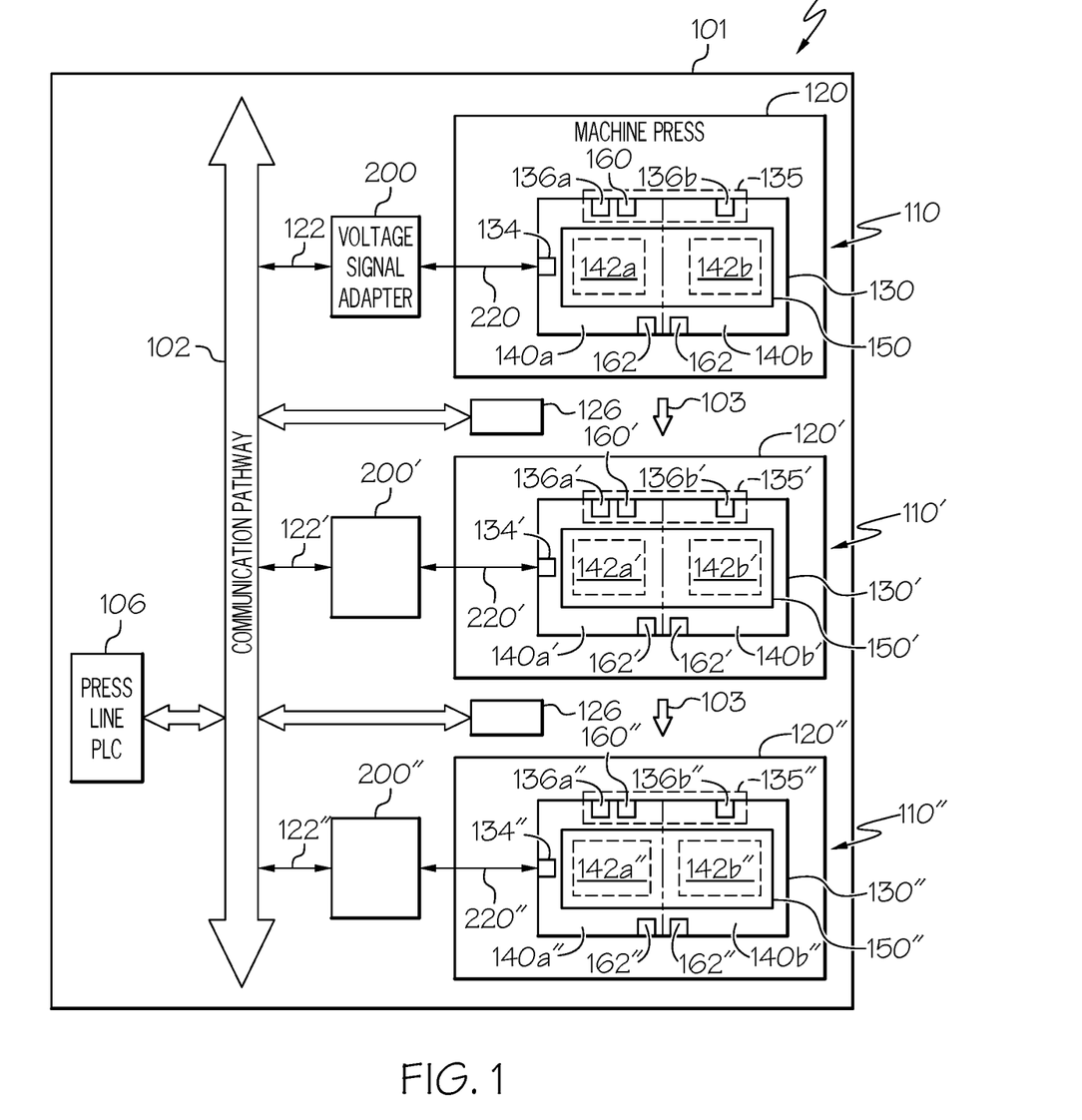
FIG. 1 schematically depicts a press line system including one or more machine presses each having a manufacturing die positioned thereon according to one or more embodiments shown or described herein.

Referring now to FIG. 1, a press line system 100 is depicted. The press line system 100 includes a press line 101 comprising one or more machine presses 110, for example a first machine press 110, a second machine press 110', a third machine press 110", and a press line programmable logic controller (press line PLC) 106 communicatively coupled to each machine press 110, 110', 110" using a communication pathway 102. As used herein, the term "communicatively coupled" means that coupled components are capable of exchanging data signals with one another such as, for example, electrical signals via conductive medium, electromagnetic signals via air, optical signals via optical waveguides, and the like. As depicted in FIG. 1, a first manufacturing die 130, a second manufacturing die 130', and a third manufacturing die 130" may be positioned on and coupled to each of the machine presses 110, 110', 110", respectively. As used herein, the term "manufacturing die" refers to the press tooling used in cutting and/or forming a part. Each manufacturing die 130, 130', 130" provides tooling such that each machine press 110, 110', 110" may perform a manufacturing operation, for example, a pressing operation, a stamping operation, a cutting operation, or the like. It should be understood that any number of machine presses 110 and manufacturing dies 130 are contemplated. Further, it should be understood that any discussion herein of an individual machine press 110 and an individual manufacturing die 130 may apply to any of the one or more machine presses 110, 110', 110" and the one or more manufacturing dies 130, 130', 130".

In operation, steps of the manufacturing operations can be uploaded or manually entered into the press line PLC 106 and communicated to the each machine press 110 along the communication pathway 102. The press line PLC 106 may comprise one or more processors capable of executing machine readable instructions such as a controller, an integrated circuit, a microchip, a computer, or any other computing device. Further, the communication pathway 102 may provide signal interconnectivity between various components of the press line system 100. Accordingly, the communication pathway 102 may be formed from any medium that is capable of transmitting a signal such as, for example, conductive wires, conductive traces, optical waveguides, or the like. In some embodiments, the communication pathway 102 may facilitate the transmission of wireless signals, such as WiFi, Bluetooth, and the like.

As schematically depicted in FIG. 1, each machine press 110 comprises a bolster 120 and a press ram 150. The bolster 120 comprises a stationary base that is used to support the manufacturing die 130 and the press tooling thereon. In some embodiments, the manufacturing die 130 may be removably coupled to the bolster 120, for example, clamped or mounted using fasteners, magnets, or the like. The machine press 110 may further comprise a bolster cable 122 extending from the bolster 120. The bolster cable 122 may be communicatively coupled to the press line PLC 106. While the bolster cable 122 may extend from the bolster 120, it may alternatively extend from other locations of the machine press 110 or may be directly coupled to the communication pathway 102. The bolster cable 122 is configured to provide communication to and from the machine press 110. Further, the machine press 110 and the manufacturing die 130 may be communicatively coupled to the press line PLC 106 to facilitate communicative coupling between the press line PLC 106 and the manufacturing die 130 of the machine press 110. Moreover, the press ram 150 may comprise a mechanically driven press, a hydraulically driven press, or the like, and the manufacturing die 130 may also be removably coupled to the press ram 150.

In some embodiments, the manufacturing die 130 comprises an upper die portion and a lower die portion each comprising one or more of a cutting surface, a stamping surface, a pressing surface, or the like. In some embodiments, the lower die portion may be coupled to the bolster 120, which provides a stationary base for the manufacturing die 130, and the upper die portion may be coupled to the press ram 150, which moves the upper die portion. In alternative embodiments, the lower die portion may be coupled to the press ram 150 and the upper die portion may be coupled to the bolster 120. The manufacturing die 130 further comprises one or more workspaces 140 (e.g., a first workspace 140a, a second workspace 140b, or the like) positioned between the upper die portion and the lower die portion and configured to receive one or more workpieces 142 (e.g., a first workpiece 142a, a second workpiece 142b, or the like). Each workpiece 142 may comprise a metal blank, for example, a tailored blank or a sheet blank. Further, while two workspaces 140 and two workpieces 142 are described herein, it should be understood that any number of workspaces 140 and workpieces 142 are contemplated.

In operation, the press ram 150 may move the upper die portion of the manufacturing die 130 toward the lower die portion such that the manufacturing die 130 may cut, stamp, or press the first and second workpieces 142a, 142b positioned within the first and second workspaces 140a, 140b, respectively. Further, the manufacturing die 130 may comprise a die communications module 134 that provides a connection module to facilitate communicative coupling between the press line PLC 106 to one or more electrical components of the machine press 110 and the manufacturing die 130, for example, one or more die sensors 135, described in more detail below. In some embodiments, the die communications module 134 may include a PLC for controlling the one or more components of the machine press 110, for example, based on communication from the press line PLC 106. Other embodiments may not include the die communications module 134 and in these embodiments, the one or more die sensors 135 may be communicatively coupled to the press line PLC 106 without using the die communications module 134.

As schematically depicted in FIG. 1, the press line 101 may further comprise one or more transport robots 126 positioned between each machine press 110, for example, between the first and second machine presses 110, 110' and between the second and third machine presses 110', 110". The transport robots 126 may be configured to transport workpieces 142a, 142b between the machine presses 110 110', 110", for example, in a manufacturing direction 103. Further, the one or more transport robots 126 may be communicatively coupled to the press line PLC 106 along the communication pathway 102, such that the transport robots 126 may operate in coordination with the machine presses 110 and the manufacturing dies 130.

Referring still to FIG. 1, the one or more die sensors 135 of the manufacturing die 130 may comprise one or more gas sensors 160 and/or one or more proximity sensors 136. The one or more gas sensors 160 are communicatively coupled to one or more gas springs 162 positioned within one or both of the first and second workspaces 140a, 140b of the manufacturing die 130. The one or more gas springs 162 may comprise nitrogen gas springs, or the like, that provide support and stabilization for the first and second workpieces 142a, 142b positioned within the first and second workspaces 140a, 140b. For example, the gas springs 162 may physically support the first and second workpieces 142a, 142b between the lower die portion and the upper die portion of the manufacturing die 130 to prevent inadvertent contact between the first and second workpieces 142a, 142b and the manufacturing die 130. Further, the gas sensor 160 may be communicatively coupled to the die communications module 134.

In operation, the gas sensor 160 may measure whether the gas springs 162 are operating properly, for example, whether the gas springs 162 are providing a predetermined support force or support force distribution, such as an evenly distributed support force. The gas sensor 160 can output a gas sensor signal communicating whether the gas springs 162 are operating properly. For example, if the gas springs 162 are not operating properly, the gas sensor 160 may output a gas sensor signal that comprises an interlock signal. When the interlock signal is received by the press line PLC 106, the press line PLC 106 may output stop signals to the one or more machine presses of the press line 101 to stop the operation of the machine press 110 comprising the manufacturing die 130 with a faulty gas spring 162 and, in some embodiments, to stop the operation of each machine press 110 of the press line 101. Further the gas sensor 160 may be communicatively coupled to the die communications module 134 for communicating with the press line PLC 106. In operation, the gas sensor signals output by one or more gas sensors 160 comprise direct current (DC) sensor signals, for example 24 volt DC sensor signals. Moreover, the gas sensor 160 may operate based on control signals received from the press line PLC 106 may be configured to receive DC control signals, for example 24 volt DC control signals.

Referring still to FIG. 1, the one or more die sensors 135 of the manufacturing die 130 may further include one or more proximity sensors 136 configured to detect the presence of an individual workpiece 142 within an individual workspace 140. The proximity sensors 136 may be any device capable of outputting a sensor signal comprising a proximity signal indicative of a presence and/or proximity of the workpiece 142 positioned within the workspace 140 of the manufacturing die 130. In some embodiments, the proximity sensors 136 may include a laser scanner, a capacitive displacement sensor, a Doppler effect sensor, an eddy-current sensor, an ultrasonic sensor, a magnetic sensor, an optical sensor, a radar sensor, a sonar sensor, or the like.

As depicted in FIG. 1, the one or more proximity sensors 136 may comprise a first proximity sensor 136a configured to output a first proximity signal when the first workpiece 142a is positioned within the first workspace 140a. Further, the manufacturing die 130 may comprise a second proximity sensor 136b configured to output a second proximity signal when the second workpiece 142b is positioned within the second workspace 140b. In operation, the first proximity signal communicates the presence or absence of the first workpiece 142a within the first workspace 140a and the second proximity signal communicates the presence or absence of the second workpiece 142b within the second workspace 140b. In some embodiments, two or more proximity sensors 136 may be positioned in both the first workspace 140a and the second workspace 140b.

Further, each proximity sensor 136, for example, the first and second proximity sensors 136a, 136b, may be communicatively coupled to the die communications module 134 of the manufacturing die 130 for communication with the press line PLC 106. In operation, the one or more proximity sensors 136 may output a detection signal, for example, an electromagnetic signal, or the like, into the workspace 140 and detect the presence of the workpiece 142 in the workspace 140. The proximity sensors 136 operate, e.g., output the detection signal, upon receipt of a control signal and in particular, a DC control signal, for example a 24 volt DC control signal. Further, when the one or more proximity sensors 136 detect the presence of the workpiece 142 in the workspace 140, the proximity sensors 136 output a gas sensor signal (e.g., a proximity sensor signal) comprising a DC sensor signal, for example a 24 volt DC sensor signal.

Referring still to FIG. 1, the press line PLC 106 is communicatively coupled to each machine press 110 of the press line 101, for example, using the communication pathway 102. In operation, the press line PLC 106 outputs control signals to the machine press 110 such that the manufacturing die 130 receives the control signals of the press line PLC 106 through the machine press 110. For example, the press line PLC 106 may output control signals to the die sensors 135 of the manufacturing die 130 and the press line PLC 106 may receive sensor signals from the die sensors 135 of the manufacturing die 130. In operation, the press line PLC 106 is configured to output alternating current (AC) control signals, for example, 120 volt AC control signals and is configured to receive AC sensor signals, for example, 120 volt AC sensor signals. Because, the one or more die sensors 135 of the manufacturing die 130 are configured to receive DC control signals and output DC sensor signals, the one or more die sensors 135 may not be communicatively compatible with the press line PLC 106. While control signals are described herein, the press line PLC 106 may also output power signals, which may provide power to the machine press 110, the manufacturing die 130, and the one or more die sensors 135.

To facilitate communicative compatibility, the press line system 100 may further comprise one or more voltage signal adaptors 200 that may be communicatively coupled to the machine press 110 and the manufacturing die 130 to communicatively couple each manufacturing die 130 with the press line PLC 106 (e.g., through the machine press 110). As described in more detail below, the voltage signal adaptor 200 (FIGS. 2 and 3) is configured to convert the AC control signals output by the press line PLC 106 to DC control signals, such that the one or more die sensors 135 can operate based on the DC control signals. Further, the voltage signal adaptor 200 is configured to convert DC sensor signals output by the one or more die sensors 135 to AC sensors signals, such that the press line PLC 106 can receive sensor information output by the one or more die sensors 135.

Figure 2:
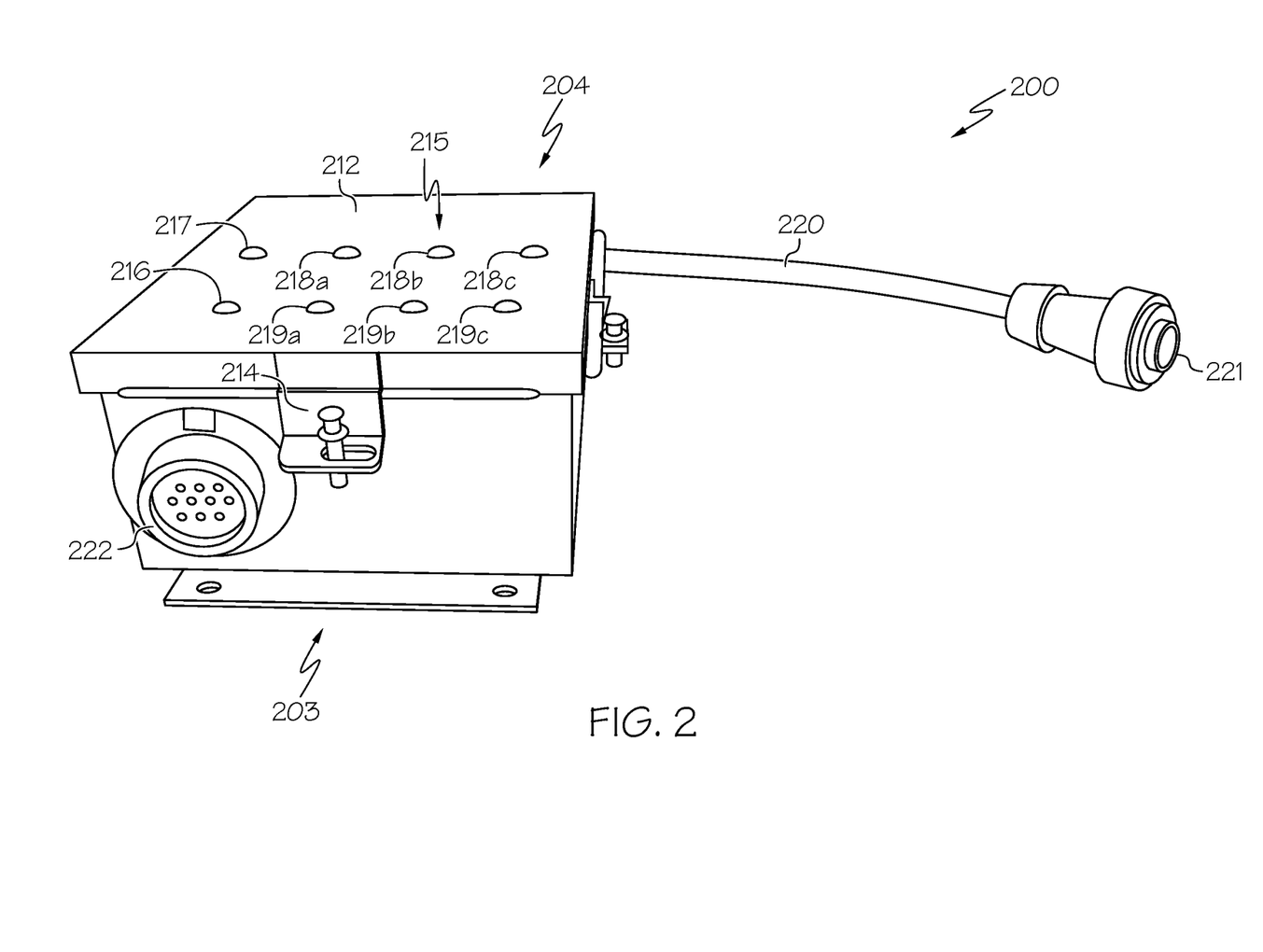
FIG. 2 depicts a voltage signal adaptor according to one or more embodiments shown or described herein.

Referring now to FIG. 2, the voltage signal adaptor 200 is depicted in more detail. The voltage signal adaptor 200 may comprise a housing 210 having a die connector side 203 and a bolster connector side 204. The housing 210 may comprise a cover 212, for example, a hinged cover, or the like, and may comprise one or more latches 214 for latching the cover 212 in a closed position. Further, a die cable 220 may extend outward from the housing 210, for example, outward from the die connector side 203 of the housing 210 and may terminate at a die cable end 221 configured to removably engage the die communications module 134, to communicatively couple the voltage signal adaptor 200 and the manufacturing die 130. In some embodiments, the die cable 220 comprises a NANABOSHI cable, however, it should be understood that any cable is contemplated. In operation, when the die cable 220 is engaged with the manufacturing die 130, the voltage signal adaptor 200 may be communicatively coupled with the first proximity sensor 136a, the second proximity sensor 136b, and the gas sensor 160, and other components of the machine press 110, such as the press ram 150. In some embodiments, the voltage signal adaptor 200 may comprise multiple die cables 220 to facilitate communicative coupling between the voltage signal adaptor 200 and multiple manufacturing dies 130.

Referring still to FIG. 2, the voltage signal adaptor 200 further comprises a cable receptacle 222 positioned, for example, at the bolster connector side 204 of the housing 210. The cable receptacle 222 may comprise any electrical plug receptacle configured to receive an electrical plug, for example, the bolster cable 122. The cable receptacle 222 may be communicatively coupled to the die cable 220 such that signals received by the die cable 220 from the press line PLC 106 are receivable by electrical plugs coupled to the cable receptacle 222. In operation, the cable receptacle 222 is configured to receive the bolster cable 122, to communicatively couple the voltage signal adaptor 200 and the press line PLC 106. In some embodiments, the voltage signal adaptor 200 may comprise multiple cable receptacles 222 to facilitate communicative coupling between the voltage signal adaptor 200 and multiple bolster cables 122.

Figure 3:
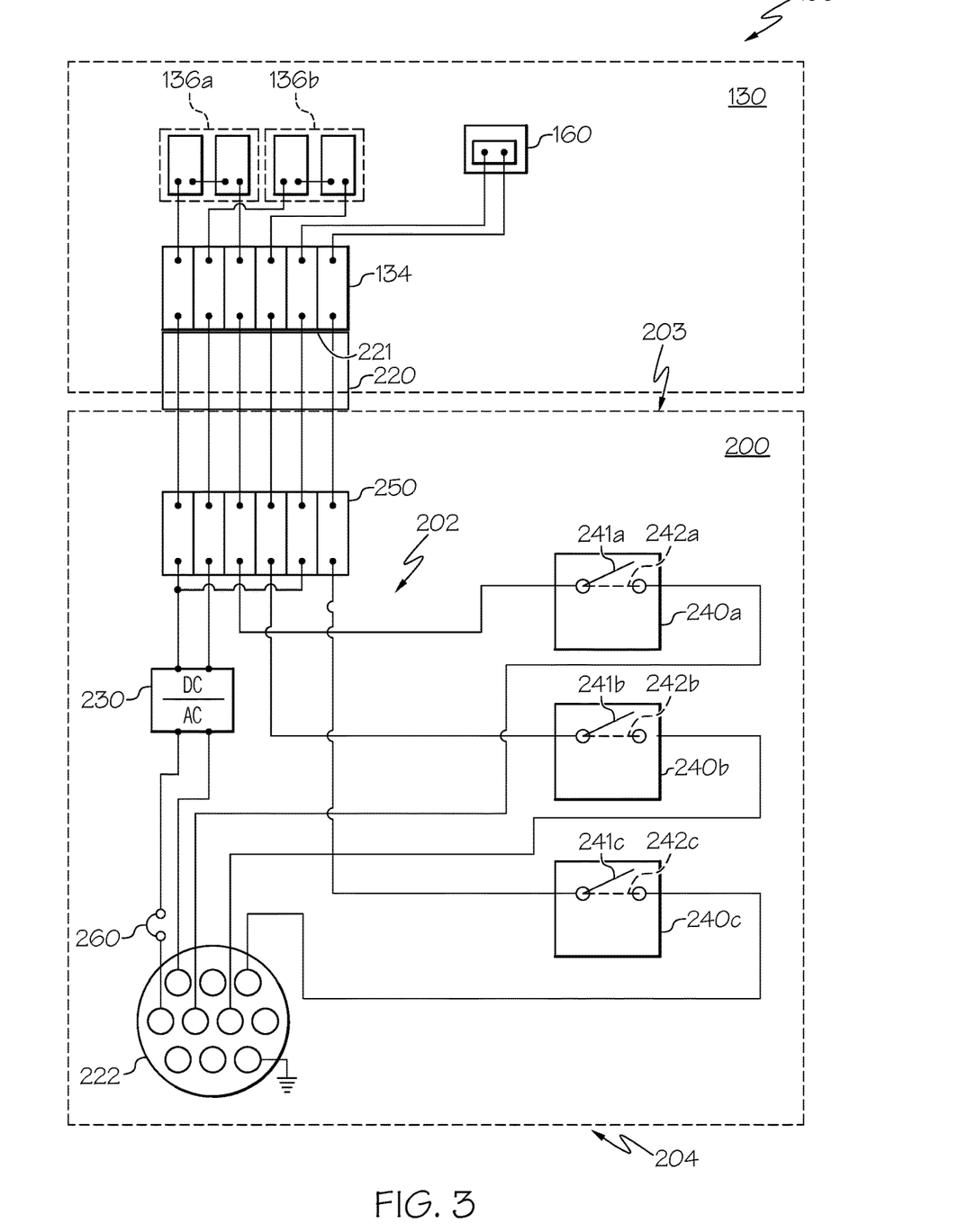
FIG. 3 schematically depicts the voltage signal adaptor of FIG. 2 communicatively coupled to a manufacturing die according to one or more embodiments shown or described herein.

Referring to FIG. 3, the voltage signal adaptor 200 further comprises a step down power supply 230 and one or more signal conversion switches 240, for example, a first signal conversion switch 240a, a second signal conversion switch 240b, and a signal conversion switch 240c. The step down power supply 230 and each of the signal conversion switches 240 are positioned between and communicatively coupled to the cable receptacle 222 and the die cable 220. The step down power supply 230 is configured to convert an AC signal to a DC signal and step down voltage of a signal. For example, the step down power supply 230 may convert a 120 volt AC signal to a 24 volt DC signal. In some embodiments, the step down power supply 230 may comprise a 24 volt DC power supply (e.g., a 24 volt transformer) that is powered by a 120 volt AC signal. In particular, the 24 volt DC power supply outputs a 24 volt DC signal upon receipt of a 120 volt AC signal.

In operation, the step down power supply 230 may convert the AC control signals output by the press line PLC 106 into the DC control signals that are receivable by the one or more die sensors 135 of the manufacturing die 130. Further, the voltage signal adaptor 200 may comprise a single step down power supply 230 and each AC control signal output by the press line PLC 106 (e.g., AC control signals providing communication to each individual die sensor 135 of the manufacturing die 130) may be converted to a DC control signal by the signal step down power supply 230. However, it should be understood that in alternative embodiments, the voltage signal adaptor 200 may comprise multiple step down power supplies 230.

As depicted in FIG. 3, the one or more signal conversion switches 240 each comprise a solid state relay, for example, an isolation relay. The one or more signal conversion switches 240 are each actuatable between an open position 241 and a closed position 242. The one or more signal conversion switches 240 are configured to convert the DC sensor signals output by each of the one or more die sensors 135 into AC sensor signals receivable by the press line PLC 106. For example, the one or more signal conversion switches 240 comprise 120 volt AC switches that output a 120 volt AC signal upon receipt by a 24 volt DC signal output by the one or more die sensors 135. For example, when an individual signal conversion switch 240 receives a DC sensor signal output by an individual die sensor 135, the individual signal conversion switch 240 actuates from the open position 241 to the closed position 242 and outputs an AC sensor signal corresponding with the DC sensor signal output by the one or more die sensors 135 such that the press line PLC 106 can receive sensor data output by the one or more die sensors 135. In operation, the one or more signal conversion switches 240 may be biased into the open position 241 such that the signal conversion switch 240 is positioned in open position 241 until the signal conversion switch 240 receives a DC sensor signal.

Further, the voltage signal adaptor 200 may comprise multiple signal conversion switches 240, for example, a signal conversion switch 240 for each die sensor 135 of the manufacturing die 130. In the non-limiting example depicted in FIG. 3, the first signal conversion switch 240a is communicatively coupled to the first proximity sensor 136a and is configured to output an AC sensor signal corresponding with the DC proximity sensor signal received from the first proximity sensor 136a. The second signal conversion switch 240b is communicatively coupled to the second proximity sensor 136b and is configured to output an AC sensor signal corresponding with the DC proximity sensor signal received from the second proximity sensor 136b. The third signal conversion switch 240c is communicatively coupled to the gas sensor 160 and is configured to output an AC sensor signal corresponding with the DC gas sensor signal output by the gas sensor 160. Further, the voltage signal adaptor 200 may comprise the same number of signal conversion switches 240 as the number of die sensors 135 of the manufacturing die 130 and each signal conversion switch 240 may be communicatively coupled to an individual die sensor 135. While the voltage signal adaptor 200 is descried herein comprising particular circuitry components, (e.g., the step down power supply 230 and the one or more signal conversion switches 240) the voltage signal adaptor 200 may comprise any devices configured to convert AC signals to DC signals and also convert DC signals to AC signals.

Referring still to FIG. 3, the voltage signal adaptor 200 further comprises a plurality of signal pathways 202, such as conductive wires, conductive traces, or the like, that provide a pathway for electrical signals (e.g., control signals output by the press line PLC 106 and sensor signals output by the one or more die sensors 135 of the manufacturing die 130) to traverse the voltage signal adaptor 200, for example, between the die cable 220 and the cable receptacle 222. Further, the one or more signal pathways 202 are communicatively coupled to the step down power supply 230 and the one or more signal conversion switches 240 such that the voltage signals traversing the one or more signal pathways 202 may be converted between AC signals and DC signals. An electronics terminal 250 may be positioned within the housing 210 of the voltage signal adaptor 200 and provides an electrical coupling location for individual signal pathways of the plurality of signal pathways 202. Further, a circuit breaker 260 may be coupled to at least one of the one or more signal pathways 202 and in some embodiments; multiple circuit breakers 260 are contemplated.

In operation, the plurality of signal pathways 202 may carry an electrical signal between the manufacturing die 130, for example, the one or more die sensors 135 of the manufacturing die 130 and the bolster cable 122 to communicatively couple the press line PLC 106 and the manufacturing die 130. For example, the plurality of signal pathways 202 may carry AC control signals between the press line PLC 106 and the step down power supply 230 and DC control signals between the step down power supply 230 and the one or more die sensors 13. Further, the plurality of signal pathways 202 may carry DC sensor signals output by the one or more proximity sensors 136 and the gas sensor 160 between the die cable end 221 and the signal conversion switches 240 and carry AC sensor signals from the signal conversion switches 240 to the cable receptacle 222.

Referring again to FIG. 2, one or more signal indicator lights 215 may be positioned on the cover 212 of the housing 210 and may be communicatively coupled to the one or more signal pathways 202. In operation, the one or more signal indicator lights 215 may illuminate to provide information regarding the status and/or operation of one or more components of the press line system 100 that are communicatively coupled to the voltage signal adaptor 200. For example, the one or more signal indicator lights 215 may include a control signal indicator light 216 and a step down power supply indicator light 217. The control signal indicator light 216 illuminates when the AC control signal is supplied from the press line PLC 106 to the voltage signal adaptor 200, for example, when the bolster cable 122 is plugged into the cable receptacle 222. Further, the step down power supply indicator light 217 is communicatively coupled to the step down power supply 230 and illuminates when the step down power supply 230 is operating properly, e.g., powered and in a condition to convert an AC signal to a DC signal.

The one or more signal indicator lights 215 may further comprise one or more sensor signal input indicator lights 218 and one or more sensor signal output indicator lights 219. Each individual sensor signal input indicator light 218 is communicatively coupled to an individual die sensor 135 and each individual sensor signal output indicator light 219 is communicatively coupled to an individual signal conversion switch 240. In operation, the individual sensor signal input indicator light 218 illuminates when the individual signal conversion switch 240 receives the DC sensor signal from the individual die sensor 135. Further, each individual sensor signal output indicator light 219 illuminates when the individual signal conversion switch 240 outputs the AC sensor signal corresponding to the DC sensor signal received from the individual die sensor 135.

As depicted in FIG. 2, the voltage signal adaptor 200 may comprise a first sensor signal input indicator light 218a that illuminates when the first signal conversion switch 240a receives the DC sensor signal output by the first proximity sensor 136a, a second sensor signal input indicator light 218b that illuminates when the second signal conversion switch 240b receives the DC sensor signal output by the second proximity sensor 136b, and a third sensor signal input indicator light 218c that illuminates when the third signal conversion switch 240c receives the DC sensor signal output by the gas sensor 160. the voltage signal adaptor 200 may further comprise a first sensor output indicator light 219a that illuminates when the first signal conversion switch 240a outputs the AC sensor signal corresponding with the DC sensor signal output by the first proximity sensor 136a, a second sensor output indicator light 219b that illuminates when the second signal conversion switch 240b outputs the AC sensor signal corresponding with the DC sensor signal output by the second proximity sensor 136b, and a third sensor output indicator light 219c that illuminates when the third signal conversion switch 240c outputs the AC sensor signal corresponding with the DC sensor signal output by the gas sensor 160.

It should now be understood that the above described press line systems include a voltage signal adaptor for communicatively coupling one or more die sensors of a manufacturing die with a press line PLC configured to output AC control. The one or more die sensors include, proximity sensors and gas sensors configured to output proximity signals and gas sensor signals that comprise DC sensor signals. The voltage signal adaptor includes a step down power supply and one or more signal conversion switches. The step down power supply is configured to convert AC control signals received from the press line programmable logic controller to DC control signals, which are receivable by the one or more die sensors. Further, the one or more signal conversion switches are configured to convert DC sensor signals received the die sensors of the manufacturing die to AC sensor signals, which are receivable by the press line PLC 106. In operation, the step down power supply and the one or more signal conversion switches provide communication compatibility between the press line PLC and the one or more die sensors of the manufacturing die such that the press line PLC can provide control signals to the one or more die sensors and the press line PLC can receive sensor data from the one or more die sensors.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A voltage signal adaptor comprising:
   a housing;
   a die cable extending outward from the housing and terminating at a die cable end engageable with a manufacturing die comprising one or more die sensors;
   a cable receptacle communicatively coupled to the die cable, wherein the cable receptacle is engageable with a bolster cable of a machine press communicatively coupled to a press line programmable logic controller;
   a step down power supply positioned between and communicatively coupled to the cable receptacle and the die cable; and
   one or more signal conversion switches positioned between and communicatively coupled to the cable receptacle and the die cable.

2. The voltage signal adaptor of claim 1, wherein the step down power supply is configured to convert an alternating current control signal into a direct current control signal.

3. The voltage signal adaptor of claim 1, wherein the one or more signal conversion switches are configured to convert a direct current sensor signal into an alternating current sensor signal.

4. The voltage signal adaptor of claim 1, wherein the one or more signal conversion switches comprise an open position and a closed position and are actuatable between the open position and the closed position, upon receipt of a direct current sensor signal output by the one or more die sensors.

5. The voltage signal adaptor of claim 1, further comprising one or more signal indicator lights.

6. The voltage signal adaptor of claim 1, wherein the one or more die sensors comprise one or more proximity sensors and one or more gas sensors.

7. A method of communicatively coupling a manufacturing die and a press line programmable logic controller, the method comprising:

positioning the manufacturing die on a machine press, wherein the machine press comprises a bolster cable and the manufacturing die comprises one or more die sensors;
providing a voltage signal adaptor comprising:
   a housing;
   a die cable engageable with the manufacturing die;
   a cable receptacle communicatively coupled to the die cable and configured to receive the bolster cable;
   a step down power supply positioned between and communicatively coupled to the cable receptacle and the die cable; and
   one or more signal conversion switches positioned between and communicatively coupled to the cable receptacle and the die cable;
coupling the die cable to the manufacturing die;
coupling the bolster cable to the cable receptacle;
outputting, using the press line programmable logic controller, an alternating current control signal; and
converting, using the step down power supply, the alternating current control signal into a direct current control signal.

8. The method of claim 7, further comprising:
outputting, using the one or more die sensors, a direct current sensor signal; and
converting, using the one or more signal conversion switches, the direct current sensor signal into an alternating current sensor signal.

9. The method of claim 7, wherein the one or more die sensors comprise one or more proximity sensors configured to detect the presence of a workpiece within a workspace of the manufacturing die and output a direct current sensor signal when the workpiece is positioned in the workspace.

10. The method of claim 7, wherein:
the manufacturing die comprises a gas spring positioned within a workspace of the manufacturing die;
the one or more die sensors comprise a gas sensor communicatively coupled to the gas spring positioned in the workspace of the manufacturing die; and
the gas sensor is configured to output a direct current sensor signal corresponding with the operation of the gas spring.

\* \* \* \* \*